(12) United States Patent
Wu et al.

(10) Patent No.: US 12,390,730 B2
(45) Date of Patent: Aug. 19, 2025

(54) METHOD AND APPARATUS FOR CONTROLLING INFORMATION IN RACING GAME AND ELECTRONIC DEVICE

(71) Applicant: NETEASE (HANGZHOU) NETWORK CO., LTD., Zhejiang (CN)

(72) Inventors: Changwen Wu, Zhejiang (CN); Yuyuan Jiang, Zhejiang (CN); Zhenhua Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 274 days.

(21) Appl. No.: 18/001,478

(22) PCT Filed: Oct. 30, 2020

(86) PCT No.: PCT/CN2020/125576
§ 371 (c)(1),
(2) Date: Dec. 12, 2022

(87) PCT Pub. No.: WO2021/248789
PCT Pub. Date: Dec. 16, 2021

(65) Prior Publication Data
US 2023/0241498 A1    Aug. 3, 2023

(30) Foreign Application Priority Data

Jun. 12, 2020 (CN) .......................... 202010540056.1

(51) Int. Cl.
*A63F 13/53* (2014.01)
*A63F 13/426* (2014.01)
(Continued)

(52) U.S. Cl.
CPC .......... *A63F 13/533* (2014.09); *A63F 13/426* (2014.09); *A63F 13/5378* (2014.09); *A63F 13/56* (2014.09); *A63F 13/803* (2014.09)

(58) Field of Classification Search
CPC .......... A63F 13/25; A63F 13/40; A63F 13/42; A63F 13/426; A63F 13/45; A63F 13/46;
(Continued)

(56) References Cited

U.S. PATENT DOCUMENTS

| 2017/0087466 | A1 | 3/2017 | Knutsson |
| 2017/0166221 | A1* | 6/2017 | Osterman .............. A63G 31/00 |

(Continued)

FOREIGN PATENT DOCUMENTS

| CN | 1643884 A | 7/2005 |
| CN | 1856342 A | 11/2006 |

(Continued)

OTHER PUBLICATIONS

International Search Report dated Mar. 10, 2021 for PCT International Application No. PCT/CN2020/125576.

(Continued)

*Primary Examiner* — Omkar A Deodhar
(74) *Attorney, Agent, or Firm* — Qinghong Xu

(57) ABSTRACT

A method and apparatus for controlling information in a racing game and an electronic device are provided. The method includes displaying road book indication control in a first graphical user interface in response to a road book triggering event; generating road book indication information in response to a triggering operation for the road book indication control; and sending the road book indication information to the second terminal device for being displayed on a second graphical user interface provided by a second terminal device, wherein the road book indication information is used for prompting a user of the second (Continued)

terminal device to control the movement of the virtual object based on the road book indication information.

19 Claims, 7 Drawing Sheets

(51) Int. Cl.
  *A63F 13/533* (2014.01)
  *A63F 13/5378* (2014.01)
  *A63F 13/56* (2014.01)
  *A63F 13/803* (2014.01)
(58) Field of Classification Search
  CPC .... A63F 13/50; A63F 13/533; A63F 13/5375; A63F 13/5378; A63F 13/55; A63F 13/56; A63F 2300/30; A63F 2300/305; A63F 2300/6045; A63F 2300/61; A63F 2300/63; A63F 2300/64; A63F 2300/646; A63F 2300/65
  See application file for complete search history.

(56) References Cited

U.S. PATENT DOCUMENTS

| | | | |
|---|---|---|---|
| 2017/0206803 A1 | 7/2017 | Park et al. | |
| 2019/0030431 A1 | 1/2019 | Zhang | |
| 2019/0118078 A1 | 4/2019 | Li | |
| 2021/0245044 A1* | 8/2021 | French | A63F 13/47 |

FOREIGN PATENT DOCUMENTS

| | | |
|---|---|---|
| CN | 101119782 A | 2/2008 |
| CN | 108744512 A | 11/2018 |
| CN | 109173257 A | 1/2019 |
| CN | 109876442 A | 6/2019 |
| CN | 109908574 A | 6/2019 |
| CN | 109908581 A | 6/2019 |
| CN | 110639200 A | 1/2020 |
| CN | 111093784 A | 5/2020 |
| CN | 111729294 A | 10/2020 |
| JP | 2001314657 A | 11/2001 |
| JP | 2009273757 A | 11/2009 |
| WO | 2013122195 A | 8/2013 |
| WO | 2016013713 A1 | 1/2016 |
| WO | 2018091860 A | 5/2018 |

OTHER PUBLICATIONS

The First Office Action dated Jan. 21, 2021 for Chinese Patent Application No. 202010540056.1.

3rd Office Action dated May 18, 2023 of Chinese Application No. 202010540056.1.

* cited by examiner

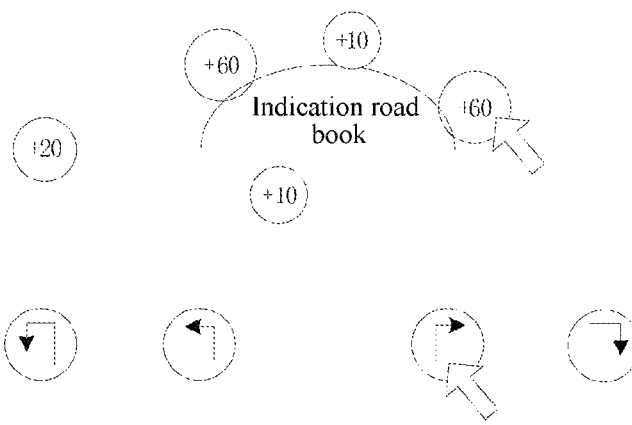
FIG.13
| Size | Style | Score | Duration(s) | Percentage of a crit period |
|---|---|---|---|---|
| Large |  | 60、80、100 | 2s-4s | 20% |
| Medium |  | 30、40、50 | 2s-5s | 30% |
| Small |  | 10、20 | 4s-6s | 40% |
When it is clicked in a crit period, double points are earned
FIG.14
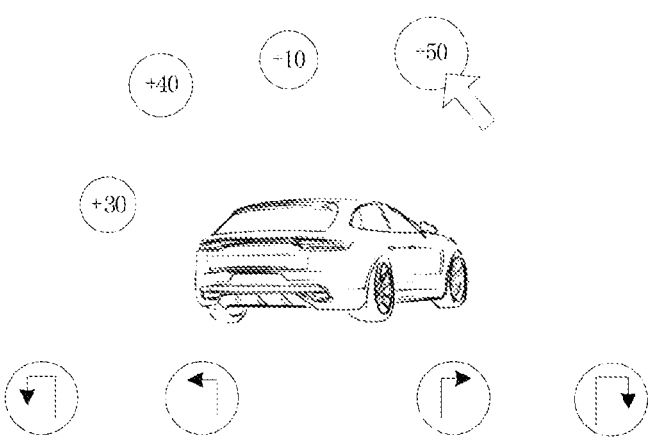
FIG.15

METHOD AND APPARATUS FOR CONTROLLING INFORMATION IN RACING GAME AND ELECTRONIC DEVICE

CROSS-REFERENCE

The present application is a U.S. National Stage of International Application No. PCT/CN2020/125576, filed on Oct. 30, 2020, and claims the priority to the Chinese Patent Application NO. 202010540056.1, entitled "RACING GAME INFORMATION CONTROL METHOD AND APPARATUS, AND ELECTRONIC DEVICE", filed on Jun. 12, 2020, the entire contents of which are hereby incorporated by reference.

TECHNICAL FIELD

The present disclosure relates to the field of game technologies, and in particular, to a method and apparatus for controlling information in a racing game, and an electronic device.

BACKGROUND

Game mechanisms of racing games lead to poor interaction between players, and it is difficult for the players to have a strong cooperative relationship, as a result, game experience that the racing games give the players is like playing console games.

SUMMARY

In a first aspect, embodiments of the present disclosure provide a method for controlling information in a racing game, wherein a first graphical user interface is provided by a first terminal device, the first graphical user interface at least includes a virtual object, and movement of the virtual object is controlled by a second terminal device; the method includes: displaying a road book indication control in the first graphical user interface in response to a road book triggering event; generating road book indication information in response to a triggering operation for the road book indication control; and sending the road book indication information to the second terminal device for being displayed on a second graphical user interface provided by the second terminal device, wherein the road book indication information is used for prompting a user of the second terminal device to control the movement of the virtual object based on the road book indication information.

In a second aspect, the embodiments of the present disclosure provide a method for controlling information in a racing game, wherein a second graphical user interface is provided by a second terminal device, the second graphical user interface at least includes a virtual object, and movement of the virtual object is controlled by the second terminal device; the method includes: controlling the movement of the virtual object in response to a control operation for the virtual object; and in response to an event of receiving road book indication information, displaying a received road book indication information on the graphical user interface, wherein the road book indication information is generated by a first terminal device, and the road book indication information is used for prompting a user of the second terminal device to control the movement of the virtual object based on the road book indication information.

In a third aspect, the embodiments of the present disclosure provide an apparatus for controlling information in a racing game, wherein a first graphical user interface is provided by a first terminal device, the first graphical user interface at least includes a virtual object, and movement of the virtual object is controlled by a second terminal device; the apparatus includes: a control display module, configured to display a road book indication control in the first graphical user interface in response to a road book triggering event; an information generation module, configured to generate road book indication information in response to a triggering operation for the road book indication control; and an information sending module, configured to send the road book indication information to the second terminal device for being displayed on a second graphical user interface provided by the second terminal device, wherein the road book indication information is used for prompting a user of the second terminal device to control the movement of the virtual object based on the road book indication information.

In a fourth aspect, the embodiments of the present disclosure provide an apparatus for controlling information in a racing game, wherein a second graphical user interface is provided by a second terminal device, the second graphical user interface at least includes a virtual object, and movement of the virtual object is controlled by the second terminal device; the apparatus includes: a movement control module, configured to control the movement of the virtual object in response to a control operation for the virtual object; and an information display module, configured to, in response to an event of receiving road book indication information, display a received road book indication information on the graphical user interface, wherein the road book indication information is generated by a first terminal device; wherein the road book indication information is used for prompting a user of the second terminal device to control the movement of the virtual object based on the road book indication information.

In a fifth aspect, the embodiments of the present disclosure provide an electronic device, including a processor and a memory, wherein machine-executable instructions that are capable of being executed by the processor are stored by the memory, and the processor is configured to execute the machine-executable instructions to implement the method for controlling the information in the racing game.

In a sixth aspect, the embodiments of the present disclosure provide a machine-readable storage medium having machine-executable instructions stored thereon, wherein the machine-executable instructions, when invoked and executed by a processor, cause the processor to implement the method for controlling the information in the racing game.

BRIEF DESCRIPTION OF THE DRAWINGS

In order to illustrate the technical solutions in specific embodiments of the present disclosure or in the related art more clearly, the drawings used in the description of the specific embodiments or the related art will be briefly described below. Obviously, the drawings in the following description are merely some embodiments of the present disclosure. For those of ordinary skills in the art, other drawings may also be obtained according to these drawings without creative work.

FIG. 13 is a schematic diagram of a manner for controlling information in a racing game provided by one of embodiments of the present disclosure;

FIG. 14 is a schematic diagram of a method for updating racing points provided by one of embodiments of the present disclosure;

FIG. 15 is a schematic diagram of generating a QTE in a racing game provided by one of embodiments of the present disclosure;

DETAILED DESCRIPTION

Figure 1:
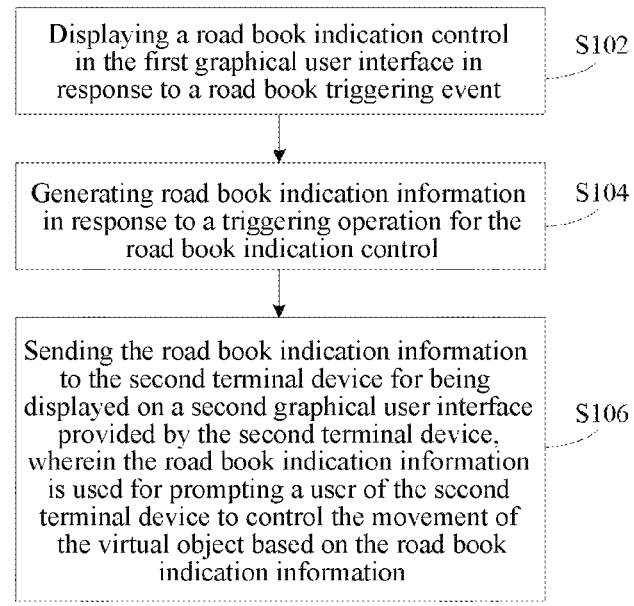
FIG. 1 is a flowchart of a method for controlling information in a racing game provided by one of embodiments of the present disclosure.

To make the objectives, technical solutions, and advantages of embodiments of the present disclosure clearer, the following describes the technical solutions of the present disclosure clearly and completely in combination with the drawings. Obviously, the described embodiments are part of the embodiments of the present disclosure, but not all of them. Based on the embodiments in the present disclosure, all other embodiments obtained by those skilled in the art without creative work belong to the protection scope of the present disclosure.

In the related art, interaction modes between the players in the racing games are limited to relay racing between the players, or cooperative charging between the players. For an entire game schedule, these interactive modes are very limited, which is difficult to effectively improve the game experience. In addition, it is not conducive to skilled players to lead novice players to participate in the games, which makes it difficult for the novice players to participate in the games.

In a racing game in the related art, relay racing may be conducted between players, so as to realize interaction between the players. When a first player is participating in the competition, a second player is in a spectating state. A deficiency of this interaction mode is in that a player in the spectating state is boring, which makes it difficult for this player to concentrate, and if the first player has a bad competition result, the second player may lose patience and may quit the game directly. In addition, this interaction mode is not helpful for skilled players to lead novice players to participate in the game. Another interaction mode in the racing game is that the players start the game separately, and when a distance between the players is close enough or the players give a like, player's props may be charged or a new skill is unlocked. For an entire game schedule, this interaction mode is very limited.

To sum up, game mechanisms of racing games lead to very limited interaction between the players, which is difficult to effectively improve the game experience. In addition, it is not helpful for the skilled players to lead the novice players to participate in the game, making it difficult for the novice players to participate in the game. Thus, an optional embodiment provides a method and apparatus for controlling information in a racing game and an electronic device, which may be applied to various types of racing games, and may be specifically applied to a scene in which a plurality of players are online at the same time and participate in the same game, so as to realize the interaction and cooperation between the players in the racing game.

In one of the embodiments of the present disclosure, the method for controlling the information in the racing game may run on a terminal device or a server. The terminal device may be a local terminal device. When the method for controlling the information in the racing game runs on the server, the method may be implemented and executed based on a cloud interaction system, and the cloud interaction system includes the server and a client device.

In an implementation, various cloud applications, such as cloud games, may be run on the cloud interaction system. Taking the cloud games as an example, the cloud games refer to games based on cloud computing. In a running mode of the cloud game, a running main body of a game program and a game picture presentation main body are separated, the storage and operation of the method for controlling the information in the racing game are done on a cloud game server, and a function of the client device is used for the reception and transmission of data and the presentation of the game picture. For example, the client device may be a display device with a data transmission function close to a user side, such as a mobile terminal, a TV, a computer, a handheld computer, etc.; but the terminal device for information processing is the cloud game server in the cloud. During the game, the player operates the client device to send an operation instruction to the cloud game server, and the cloud game server runs the game according to the operation instruction, encodes and compresses the data such as the game picture and d returns it to the client device via a network. Finally, the client performs decoding and outputs the game picture.

In an implementation, the terminal device may be a local terminal device. Taking the game as an example, the local terminal device stores the game program and is used to present the game picture. The local terminal device is used to interact with the player through a graphical user interface, that is, it is conventional to download, install and execute the game program through an electronic device. There may be multiple ways for the local terminal device to provide the graphical user interface to the player. For example, the graphical user interface may be rendered and displayed on a display screen of the terminal, or provided to the player through holographic projection. For example, the local terminal device may include the display screen and a processor, and the display screen is used to present the graphical user interface including the game picture, the processor is used to run the game, generate the graphical user interface, and control the graphical user interface to be displayed on the display screen.

In an implementation, the embodiments of the present disclosure provide a method for controlling information in a racing game, a first graphical user interface is provided by a first terminal device, and a second graphical user interface is provided by a second terminal device. The first terminal device may be the aforementioned local terminal device, or may be the client device in the aforementioned cloud interaction system. Similarly, the second terminal device may be the aforementioned local terminal device, or may be the client device in the aforementioned cloud interaction system.

It should be noted that, the implementation of the method for controlling the information in the racing game provided in an implementation requires the interaction between the first terminal device and the second terminal device. In the first graphical user interface provided by the first terminal device, a virtual object is at least included, and the virtual object may be a virtual carrier, such as a virtual vehicle, a virtual character corresponding to the player rides in the virtual carrier, and the virtual object may also be the virtual character corresponding to the player itself. Specifically, in the racing game, the virtual character includes a virtual driver and a virtual navigator. Movement of the virtual object in the first graphical user interface is controlled by the second terminal device. That is, in the racing game, a movement direction, a movement speed, a movement posture, etc. of the virtual object are all controlled by the second terminal device. In an implementation, the virtual character corresponding to the player controlling the first terminal device may be the virtual navigator, and the virtual character corresponding to the player controlling the second terminal device may be the virtual driver. The method for controlling the information in the racing game provided in an implementation is implemented by the interaction between the virtual navigator and the virtual driver.

Since the movement of the virtual object is controlled by the second terminal device, a game scene in the second terminal device usually changes continuously according to the movement of the virtual object. For example, a virtual video camera in a game space may follow the movement of the virtual object, so that the game scene displayed by the second terminal device also changes with the movement of the virtual object. In order to facilitate the interaction between the players, in an implementation, the game scene picture displayed in the first graphical user interface is adjusted through a position change of the virtual object in the game scene, and the position change of the virtual object in the game scene is controlled by the second terminal device. That is, when the second terminal device controls the movement of the virtual object, the position of the virtual object in the game scene changes, and the position change not only changes the game scene picture displayed in the second graphical user interface of the second terminal device, but also changes the game scene picture displayed in the first graphical user interface of the first terminal device. It may also be understood that when the second terminal device controls the movement of the virtual object, the game scene picture displayed in the first graphical user interface of the first terminal device always matches the game scene picture displayed in the second graphical user interface of the second terminal device.

In an implementation, the game scene picture displayed in the first graphical user interface is the same as the game scene picture displayed in the second graphical user interface. That is, when the second terminal device controls the movement of the virtual object, the game scene picture displayed in the second graphical user interface is continuously adjusted according to the movement of the virtual object, and the game scene picture displayed in the first graphical user interface is also continuously adjusted according to the movement of the virtual object simultaneously, and the adjustment manners are the same, so that the game scene picture displayed in the first graphical user interface is the same as the game scene picture displayed in the second graphical user interface. The game scene picture may be understood as the game picture content displayed in the first graphical user interface or the second graphical user interface other than individual controls that may be operated, and the picture content at least includes: the game scene, the virtual object etc. In addition, in an implementation, the player may also be referred to as the user.

In an implementation, as shown in FIG. 1, the method for controlling the information in the racing game includes the following steps S102 to S106.

In the step S102, a road book indication control is displayed in the first graphical user interface in response to a road book triggering event.

The road book triggering event may be triggered by a user or a system. When triggered by the user, the road book triggering event may be triggered by the user of the first terminal device or the user of the second terminal device, and specifically, the road book triggering event may be triggered by the user triggering a certain control or performing a specific operation. In order to make the user focus on the racing game itself, the road book triggering event may be triggered by the system. The system may monitor a game state of each virtual object in the racing game, and when the virtual object belongs to a designated game state, the system triggers the road book triggering event. The game state of the virtual object may specifically be a position of the virtual object in the game space, a movement speed and a path of the virtual object.

In an implementation, when the virtual object moves to a designated position in the game scene, the system may trigger the road book triggering event. The road book triggering event may be triggered by the second terminal device controlling the virtual object to move to the designated position in the game scene, or may also be triggered by the server determining that the virtual object moves to the designated position in the game scene. On the premise that the game scene pictures displayed in the graphical user interfaces provided by the first client and the second client, respectively are the same, the road book triggering event may also be triggered by the first terminal device determining that the virtual object moves to the designated position in the game scene. The designated position may be determined according to a virtual road in the game scene. A racing road is usually preset in the racing game, and the racing road includes a start point and an end point. The virtual object starts from a start point and moves on the racing road to reach an end point. The racing road usually has road types such as a straight road, a curved road, a ramp, a branch road, etc. During the movement of the virtual object, if a road type of a road to be passed in the future is different from a road type of a road currently being driven, the road book triggering event needs to be triggered in order to better assist the user in controlling the movement of the virtual object. In this case, a road book indication control is displayed in the first graphical user interface, and the road book indication control is used for acquiring the road book indication information triggered by the user of the first terminal device. After the road book indication information triggered by the user of the first terminal device is acquired, the road book indication information is sent to the second terminal device for guiding the user of the second terminal device to control the movement of the virtual object.

The road book indication control may be in various forms. For example, the control may be a plurality of buttons with each button corresponding to a movement direction indication, and the user clicks a button, it means that the user triggers a movement direction indication corresponding to this button, and the road book indication information may be generated according to the movement direction instruction. The road book indication control may also be an input region, and the user may input the movement direction indication in the input region, for example, the movement direction indication is drawn in the form of graffiti; the system may determine the movement direction indication by identifying a tendency of the graffiti. In addition, a joystick may also be provided in the input region, the user may control the movement of the joystick, and determine the movement direction indication based on a movement direction of the joystick.

In order to further improve a frequency of the user interaction and efficiency of the interaction, when the road book triggering event is responded, prompt information may also be displayed, in addition to displaying the road book indication control, and the prompt information is used for prompting that the first terminal device is receiving a triggering operation for the road book indication control. The prompt information may be displayed in the game scene. For example, the prompt information is displayed in front of a road where the game object is driving, so that the user may notice the prompt information, thereby triggering the road book indication control. The prompt information may be implemented in various forms, for example, it may be an eye-catching identifier, or may be text information, such as "indication road book" and so on.

In the step S104, the road book indication information is generated in response to the triggering operation for the road book indication control.

The triggering operation for the road book indication control is related to a control type of the road book indication control. For example, when the road book indication control is the button, the user clicking the button may be regarded as the triggering operation for the road book indication control. When the road book indication control is the input region, the user inputting content may be regarded as the triggering operation for the road book indication control. After the triggering operation is triggered, the road book indication information may be generated based on the triggering operation, and the road book indication information is used for indicating the movement direction of the virtual object. The specific content of the road book indication information may be determined according to a specific operation of the triggering operation. For example, the triggering operation is that the user clicks a right turn button, and in this case, the movement direction indication contained in the road book indication information is the right turn.

In the step S106, the road book indication information is sent to the second terminal device, and the road book indication information is displayed on the second graphical user interface provided by the second terminal device, the road book indication information is used for prompting the user of the second terminal device to control the movement of the virtual object based on the road book indication information.

It may be seen from the above that after the user of the first terminal device triggers the triggering operation for the road book indication control through the first terminal device, the road book indication information is generated, and then sent to the second terminal device, so as to prompt the user of the second terminal device to control the movement of the virtual object based on the road book indication information. In this way, the interaction between the players in the racing game may be realized. The virtual character corresponding to the first terminal device may be understood as the virtual navigator, and the virtual character corresponding to the second terminal device may be understood as the virtual driver. The virtual navigator generates the road book indication information by triggering the road book indication control, and prompts the virtual driver based on the road book indication information to control the movement of the virtual object according to the road book indication information. The virtual object in this case may be understood as the virtual carrier controlled by the virtual driver.

In the method for controlling the information in the racing game, the first terminal device displays the road book indication control in the first graphical user interface in response to the road book triggering event, generates the road book indication information in response to the triggering operation for the road book indication control, and then sends the road book indication information to the second terminal device for being displayed on the second graphical user interface provided by the second terminal device, the road book indication information is used for prompting the user of the second terminal device to control the movement of the virtual object based on the road book indication information. In this way, the racing game is done by the interaction between the first terminal device and the second terminal device, the first terminal device generates the road book indication information by triggering the road book indication control, and this information is displayed on the second terminal device to prompt the user of the second terminal device to control the movement of the virtual object based on this information. In this way, the users of the first terminal device and the second terminal device cooperate closely together to complete a racing game task, which enriches the interaction mode between the players in the racing game, and also facilitates the skilled players to lead the novice players to participate in the game, improving the game experience of the novice players.

The following will continue to describe specific implementations of generating the road book indication information based on different triggering operations for the road book indication control. In an implementation, the road book indication control includes a plurality of sub-controls, and each sub-control is provided with a corresponding movement direction indication of the virtual object. The movement direction indication of the virtual object may include one or more of the following: turning to the left, turning to the right, U-turning to the left, U-turning to the right, going straight ahead, going uphill, going downhill, etc., where the turning to the left and turning to the right are used to indicate a small turn of the virtual object, such as a turning less than 90 degrees, U-turning to the left and U-turning to the right are used to indicate a large turn of the virtual object, such as a turning about 180 degrees, going straight ahead is used for indicating the virtual object to go straight ahead when there is a fork including a straight forward road and a turning or U-turning road in the virtual road ahead.

Figure 2:
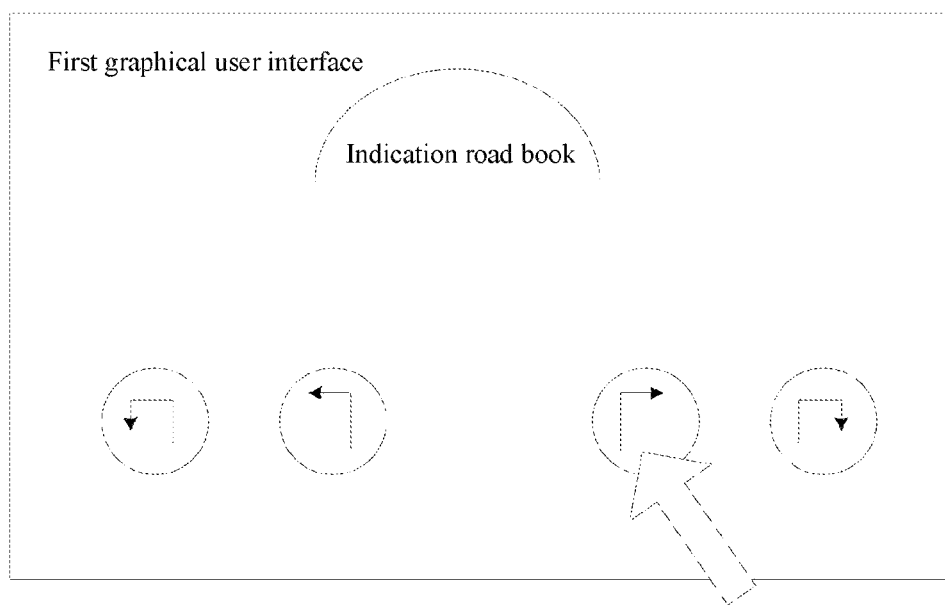
FIG. 2 is a schematic diagram of a road book indication control provided by one of embodiments of the present disclosure.

In order to facilitate understanding, taking FIG. 2 an example, the road book indication control is displayed on the first user graphical interface, the road book indication control includes four sub-controls with each sub-control being provided with the corresponding movement direction indication of the virtual object, where the movement direction indication set by a fist sub-control is U-turning to the left, the movement direction indication set by a second sub-control is turning to the left, the movement direction indication set by a third sub-control is turning to the right, and the movement direction indication set by a fourth sub-control is U-turning to the right. In addition, the prompt information "indication road book" is also displayed in the first user graphical interface to prompt the user of the first terminal device to trigger the road book indication control.

When the road book indication information is generated based on the road book indication control described above, in response to a touch operation acting on one of the plurality of sub-controls, the movement direction indication set by the sub-control corresponding to the touch operation may be determined as a target movement direction indication, and the road book indication information is generated according to the target movement direction indication. With continued reference to the example of FIG. 2, if the user of the first terminal device triggers the third sub-control with a finger, the road book indication information is generated based on the movement direction indication "turning to the right" of the third sub-control, so as to prompt the user of the second terminal device to control the virtual object to turn to the right. In this case, the movement direction indication contained in the road book indication information is "turning to the right".

Figure 3:
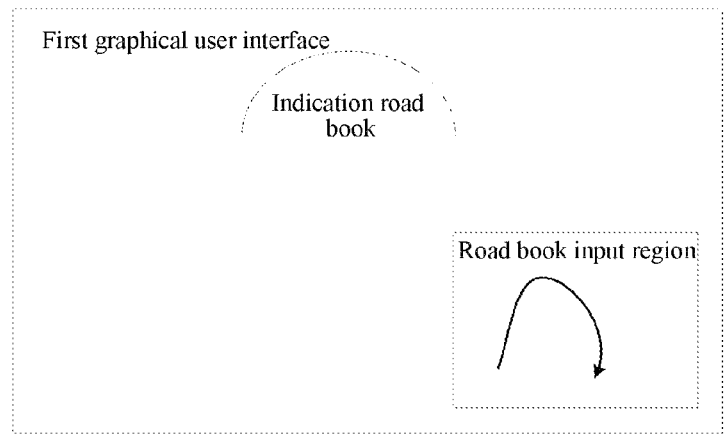
FIG. 3 is a schematic diagram of a road book indication control provided by one of embodiments of the present disclosure.

In an implementation, the road book indication control includes a road book input region, and the road book input region is used to receive input content of the user of the first terminal device. As shown in FIG. 3, the road book input region is displayed in a lower right corner of the first user graphical interface. The user may perform a graffiti operation in the road book input region, and as shown in FIG. 3, the user inputs a line similar to a semicircle in the road book input region with the finger, and an arrow indicates a drawing direction of the line. Based on content input by a road book input operation, a movement direction of the road book input operation may be recognized as "turning to the right".

Figure 4:
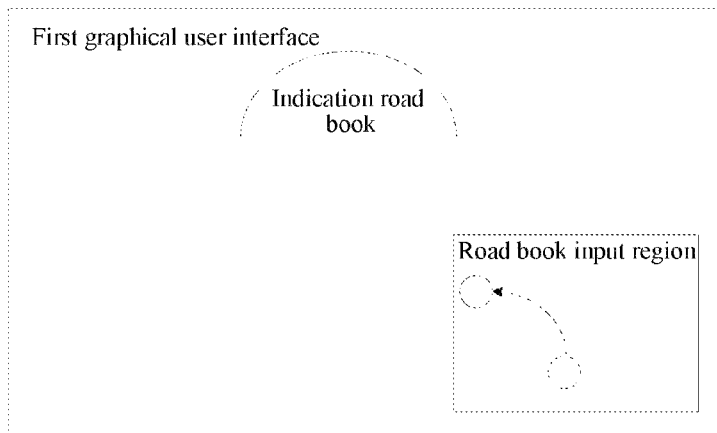
FIG. 4 is a schematic diagram of a road book indication control provided by one of embodiments of the present disclosure.

In addition to the graffiti operation, the road book input region may also be provided with a joystick, and the user of the first terminal device may input the content by controlling the joystick. For example, in FIG. 4, a circle in the road book input region represents the joystick, an initial position of the joystick is at a dotted circle, and the user of the first terminal device clicks the joystick to move, and the joystick moves according to the movement of a user's contact point. In FIG. 4, the joystick reaches a solid line circle, a dotted line with an arrow represents a movement track of the joystick, and the movement track of the joystick may be regarded as the input content of the user in the road book input region.

When the road book indication information is generated based on the road book indication control described above, in response to the road book input operation acting on the road book input region, the target movement direction indication is determined based on the content input by the road book input operation, and the road book indication information is generated based on the target movement direction indication. With continued reference to the example of FIG. 3 or FIG. 4, the content input by the road book input operation in FIG. 3 is the line similar to the semicircle, and it may be determined that the target movement direction indication is a U-turning to the right, and the content input by the road book input operation in in FIG. 4 is the movement track shifted to the left, and it may be determined that the target movement direction indication is turning to the left.

It should be noted that the road book input region may be realized in various forms, for example, by means of a form of window or floating layer, etc. The road book input region may be provided with a region boundary or no boundary, for example, the road book input region is displayed in the form of floating layer to prompt the user to perform a drawing operation in the floating layer, and for another example, the road book input region may be provided with no boundary, and only the joystick in the region may be displayed.

The different triggering operations of the road book indication control described above may also trigger a comment on the triggering operations, in addition to triggering the generation of the road book indication information. Whether it is through the touch operation on the control or the road book input operation in the road book input region, the target movement direction indication that the user wants to send may be determined. The following operations are performed based on the target movement direction indication: determining whether the target movement direction indication meets a preset condition; and if the preset condition is met, updating racing points of the first terminal device, and/or reducing a skill cooling time of an object skill of the virtual object by supplementing energy to the object skill. The above operations may be performed before generating the road book indication information, or may be performed after generating the road book indication information, or may be performed at the same time as generating the road book indication information.

The preset condition may be used to determine whether the movement direction indication given by the user is reasonable and correct. When it is determined whether the determined movement direction indication meets the preset condition, it may be specifically determined whether the target movement direction indication matches a virtual road on which the virtual object is about to travel in the racing map, and if so, it is determined that the target movement direction indication meets the preset condition. For example, the virtual road on which the virtual object is about to travel in the racing map is a left turn road, and the target movement direction indication at this point is also turning to the left, it means that the movement direction indication given by the user is reasonable and correct. For another example, the virtual road on which the virtual object is about to travel in the racing map is the left turn road, and the target movement direction indication at this point is turning to the right, it means that the movement direction indication given by the user is unreasonable and wrong.

If the target movement direction indication is reasonable and correct, the racing points of the first terminal device may be updated, and/or the skill cooling time of the object skill may be reduced by supplementing energy to the object skill. When the target movement direction indication is reasonable and correct, the racing points of the first terminal device may be increased; similarly, the second terminal device is further provided with the racing points, and a combination of the racing points of the first terminal device and the racing points of the second terminal device may determine a team's final competition score. In addition to updating the racing points of the first terminal device, the energy may also be supplemented to the object skill of the virtual object. The virtual objects with different attributes usually correspond to different object skills, for example, the object skills may be a flying skill, an acceleration skill, etc. The object skill of the virtual object may usually be used after the energy is full. After the object skill is used, it needs to wait for the energy to be full again before it may be used. Supplementing the energy to the object skill may reduce the skill cooling time of the object skill and increase a use frequency of the object skill in the competition process to facilitate the improvement of the final competition score.

It may be understood that, the energy may be supplemented to the object skill of the virtual object while the racing points of the first terminal device is updated. Alternatively, it is also possible to only update the racing points of the first terminal device or supplement the energy to the object skill of the virtual object, which may be specifically determined according to the game design.

In an implementation, the method further includes: determining whether the movement direction of the virtual object matches the movement direction indication contained in the road book indication information; and
if the movement direction matches the movement direction indication, updating the racing points of the first terminal device, and/or reducing a skill cooling time of an object skill of the virtual object by supplementing energy to the object skill.

Whether the movement direction of the virtual object matches the movement direction indication contained in the road book indication information may be determined by the second terminal device. Whether the movement direction of the virtual object matches the movement direction indication contained in the road book indication information may be determined by the game server. On the premise that the game scene pictures displayed in the graphical user interfaces provided by the first client and the second client, respectively are the same, whether the movement direction of the virtual object matches the movement direction indication contained in the road book indication information may be determined by the first terminal device.

In an implementation, after the road book indication information is sent to the second terminal device and displayed on the second graphical user interface provided by the second terminal device, the user of the second terminal device usually sees the road book indication control, and continues to control the movement of the virtual object, and then determine whether the movement direction of the virtual object matches the movement direction indication contained in the road book indication information. If the movement direction matches the movement direction indication, the racing points of the first terminal device is updated, and/or, the skill cooling time of the object skill is reduced by supplementing the energy to the object skill.

If the movement direction of the virtual object matches the movement direction indication contained in the road book indication information, it means that the user of the second terminal device controls the movement of the virtual object according to the road book indication information given by the user of the first terminal device, and the two users realize the more intimate cooperation, and also means that the road book indication information given by the user of the first terminal device is accurate and reasonable. In this case, both the racing points of the first terminal device and the racing points of the second terminal device may be updated, and the energy may be supplemented to the object skill of the virtual object to reduce the skill cooling time of the object skill. It may be understood that, while the racing points of the first terminal device is updated, the energy may also be supplemented to the object skill of the virtual object.

The above determining whether the movement direction of the virtual object matches the movement direction indication contained in the road book indication information may usually be applied before the fork road, and the fork road, for example, includes a fork road in the straight direction and a left turn fork road. If the movement direction indication contained in the road book indication information is "going straight", and the movement direction of the virtual object is also "going straight", in this case, it means that he movement direction of the virtual object matches the movement direction indication contained in the road book indication information.

In order to further improve the game player's game concentration and improve the fun of the racing game, more ways to update the racing points may also be set to increase the player's racing points. In an implementation, after the triggering operation for the road book indication control is responded, a current position of the virtual object relative to the virtual road may be acquired when the triggering operation is triggered, and the racing points of the first terminal device are updated according to the current position of the virtual object relative to the virtual road.

Specifically, when the front of the virtual road is a curved road turning to the left, a reference position may be determined at or near a position of the curved road. When the triggering operation is triggered, the closer a distance between the current position of the virtual object relative to the virtual road and the reference position, the higher the increased value of the racing points. However, if the current position of the virtual object relative to the virtual road exceeds the reference position, the racing points will not be updated. In this way, the player may be guided to realize an extreme operation, and the fun of the racing game may be improved.

In order to facilitate the player's operation, the virtual road includes at least one target region, and each target region corresponds to an update manner for the racing points. When the triggering operation is triggered, a target region to which the current position of the virtual object relative to the virtual road belongs is determined, and the racing points of the first terminal device is updated according to an update manner for the racing points corresponding to the target region to which the current position belongs.

Figure 5:
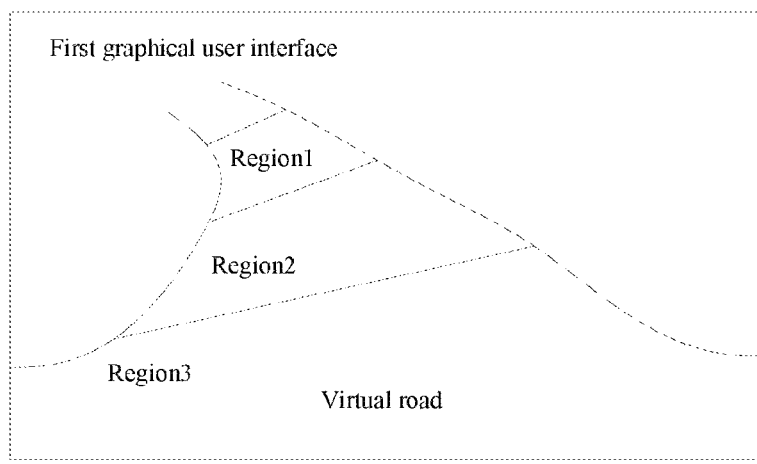
FIG. 5 is a schematic diagram of a virtual road provided by one of embodiments of the present disclosure.

For ease of understanding, FIG. 5 is an example, the virtual road is displayed in the first user graphical interface, and the virtual road is provided with three target regions, which are region 1, region 2 and region 3, respectively. An increased value of the racing points corresponding to region 1 may be, for example, 5 points, the increased value of the racing points corresponding to region 2 may be, for example, 2 times that of region 1, that is, 10 points, and the increased value of the racing points corresponding to region 3 may be, for example, 2 times that of region 2, that is, 20 points. Of course, other update manners for the racing points may also be set, as long as the increased value of the racing points corresponding to region 1 is lower than the increased value of the racing points corresponding to region 2, and the increased value of the racing points corresponding to region 2 is lower than the increased value of the racing points corresponding to region 3. The closer to the curved road of the virtual road, the higher the increased value, so that the player is guided to achieve the extreme operation and the fun of the game is improved.

In order to make the user of the first terminal device give the more reasonable and accurate road book indication information, a racing map may be provided to the user before the start of the game, allowing the user to label the racing map. Specifically, the racing map is provided on the first graphical user interface in response to a map preview triggering operation, and in response to a labeling operation on the racing map, the racing map with a labeling identifier of the labeling operation is generated, the racing map is used for being displayed on the graphical user interface of the first terminal device and/or the second terminal device during a racing game stage.

Figure 6:
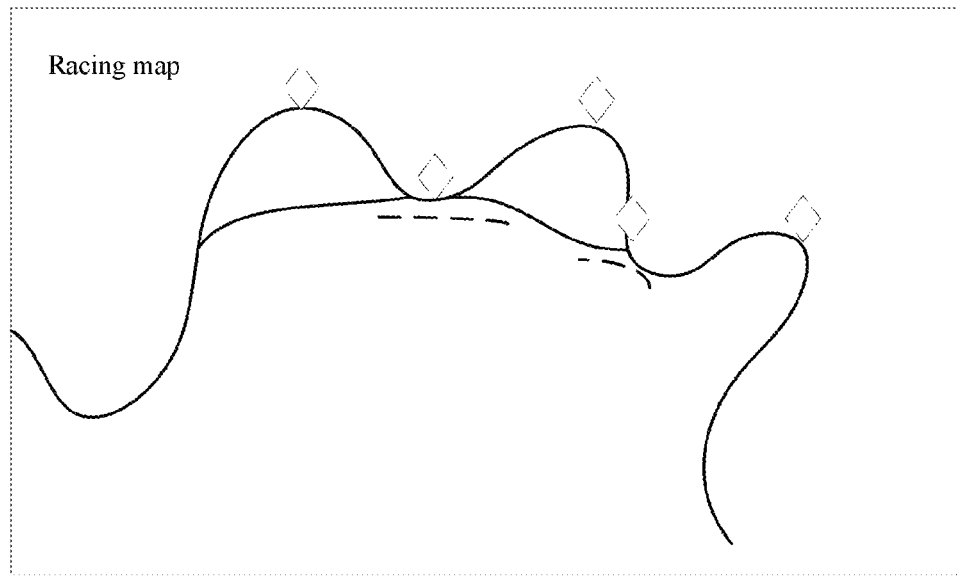
FIG. 6 is a schematic diagram of a racing map provided by one of embodiments of the present disclosure.

The racing map includes a structure and an extension direction of the virtual road, and the virtual road may be also labeled with a position on the virtual road where the road book indication operation needs to be triggered. FIG. 6 is an example of the racing map, a diamond identifier on the virtual road is used to prompt that the triggering operation for the road book indication control will be triggered at this position. Both the user of the first terminal device and the user of the second terminal device may trigger the map preview triggering operation and view the racing map. For the user of the first terminal device, since the user needs to send the road book indication information, in order to facilitate the user to send the more accurate and reasonable road book indication information, the labeling operation may be performed on the racing map, especially at a position of the fork road, a fork road with a shorter distance or a fork road with a fewer curved road may be selected, and the labeling identifiers are set at these positions. In the racing game stage, the racing map with the labeling identifiers may be displayed on the graphical user interface, and these labeling identifiers may guide the user to select a correct fork road when there is the fork road ahead.

As shown in FIG. 6, the dotted lines are the labeling identifiers of the labeling operation, and these labeling identifiers are set on the fork road. The labeling identifiers may also be set at any other position near the virtual road, such as a curved road. During the racing game stage, the racing map with the labeling identifier may be displayed on the graphical user interface in whole or in part.

In order to avoid the map preview operation may delay the player more time, the map preview triggering operation may be triggered by the triggering operation of game data loading. For example, when the player clicks a game start button, the game data loading may be triggered. During the game data loading, the racing map is displayed, and at the same time, in response to the labeling operation on the racing map by the user of the first terminal device, the labeling identifier of the labeling operation is displayed on the racing map. The process of game data loading usually lasts for several seconds or about half a minute, and after the game data loading is completed, the user is no longer allowed to continue to send the labeling operation. In response to the event that the game data loading is completed, the racing map with the labeling identifier of the labeling operation is generated.

Figure 7:
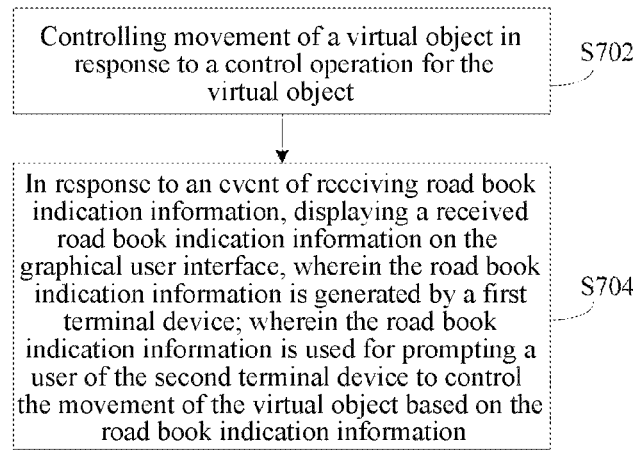
FIG. 7 is a flowchart of a method for controlling information in a racing game provided by one of embodiments of the present disclosure.

In the above embodiments, the method for controlling the information in the racing game is described from a perspective of the first terminal device, and the virtual character corresponding to the first terminal device is the virtual navigator. The method for controlling the information in the racing game is described below from the perspective of second terminal device, and the virtual character corresponding to the second terminal device is the virtual driver. The second graphical user interface is provided by the second terminal device, the second graphical user interface at least includes the virtual object, and the movement of the virtual object is controlled by the second terminal device. As shown in FIG. 7, the method includes the following steps S702 to S704.

In the step S702, the movement of the virtual object is controlled in response to a control operation for the virtual object.

The control operation may be a touch operation acting on the virtual object, or may be a touch operation acting on a joystick corresponding to the virtual object.

In the step S704, in response to an event of receiving road book indication information, the received road book indication information is displayed on the graphical user interface, and the road book indication information is generated by a first terminal device;

The road book indication information is used for prompting a user of the second terminal device to control the movement of the virtual object based on the road book indication information. The road book indication information may be generated by the first terminal device based on the methods described in the foregoing embodiments, and after generating the road book indication information, the first terminal device may send the road book indication information to the second terminal device.

In the method for controlling the information in the racing game, the first terminal device generates the road book indication information, and the second terminal device controls the movement of the virtual object in response to the control operation for the virtual object, the received road book indication information is displayed on the graphical user interface and the road book indication information is used to prompt the user of the second terminal device to control the movement of the virtual object based on the road book indication information. In this way, the racing game is done by the interaction between the first terminal device and the second terminal device, the first terminal device generates the road book indication information, and this information is displayed on the second terminal device to prompt the user of the second terminal device to control the movement of the virtual object based on this information. In this way, the users of the first terminal device and the second terminal device cooperate closely together to complete a racing game task, which enriches the interaction mode between the players in the racing game, and also facilitates the skilled players to lead the novice players to participate in the game, improving the game experience of the novice players.

The process of controlling the movement of the virtual object may be specifically implemented by the following steps: controlling the virtual object to move in a game scene displayed by the second graphical user interface in response to the control operation for the virtual object; adjusting a position of the virtual object in the game scene displayed by the second graphical user interface according to the movement of the virtual object; and determining a game scene picture displayed in the second graphical user interface according to the position of the virtual object in the game scene.

The movement of the virtual object is controlled by the second terminal device. With the movement of the virtual object, it is necessary to continuously adjust the position of the virtual object in the game scene displayed by the second graphical user interface. To provide a better viewing angle to the user of the second terminal device during the position of the virtual object changes, it is necessary to continuously adjust the game scene picture displayed in the second graphical user interface based on the position of the virtual object.

In order to facilitate the interaction between the players, in an implementation, the game scene picture displayed in the first graphical user interface is adjusted through the position change of the virtual object in the game scene. That is, when the second terminal device controls the movement of the virtual object, the position of the virtual object in the game scene changes, and the position change will not only cause the change of the game scene picture displayed in the second graphical user interface, but also cause the change of the game scene picture displayed in the first graphical user interface of the first terminal device. It may also be understood that when the second terminal device controls the movement of the virtual object, the game scene picture displayed in the first graphical user interface of the first terminal device always matches the game scene picture displayed in the second graphical user interface of the second terminal device.

In an implementation, the game scene picture displayed in the second graphical user interface is the same as the game scene picture displayed in the first graphical user interface provided by the first terminal device. That is, when the second terminal device controls the movement of the virtual object, the game scene picture displayed in the second graphical user interface is continuously adjusted according to the movement of the virtual object, while the game scene picture displayed in the first graphical user interface is also continuously adjusted according to the movement of the virtual object, and the adjustment manners are the same, so that the game scene picture displayed in the first graphical user interface is the same as the game scene picture displayed in the second graphical user interface.

In addition, after the second terminal device receives the road book indication information, the user of the second terminal device may control the movement of the virtual object according to the movement direction indication contained in the road book indication information, or may not control the movement of the virtual object according to the movement direction indication contained in the road book indication information. In order to evaluate the degree of cooperation between the users of the second terminal device and the first terminal device, it may be determined whether the movement direction of the virtual object within a preset time period matches the movement direction indication contained in the road book indication information, and if the movement direction matches the movement direction indication, an acceleration prop is generated, and the virtual object is controlled to move in an accelerated manner in response to a triggering operation on the acceleration prop; and/or, if the movement direction matches the movement direction indication, racing points of the second terminal device is updated.

The acceleration prop may be set on the virtual road, and when the virtual object moves to the position of the acceleration prop, the acceleration prop may be triggered, and at this time, the virtual object is controlled to move in the accelerated manner. The acceleration prop may be specifically an acceleration wall, when the second terminal device controls the virtual object to pass through the acceleration wall, the acceleration wall may be triggered to accelerate the movement of the virtual object. When the movement direction matches the movement direction indication, the racing points of the second terminal device may also be updated, while the racing points of the first terminal device may also be updated.

In an implementation, the user of the first terminal device and the user of the second terminal device select the virtual character, and the virtual character corresponding to the first terminal device is set as the navigator, and the virtual character corresponding to the second terminal device is the driver.

Figure 8:
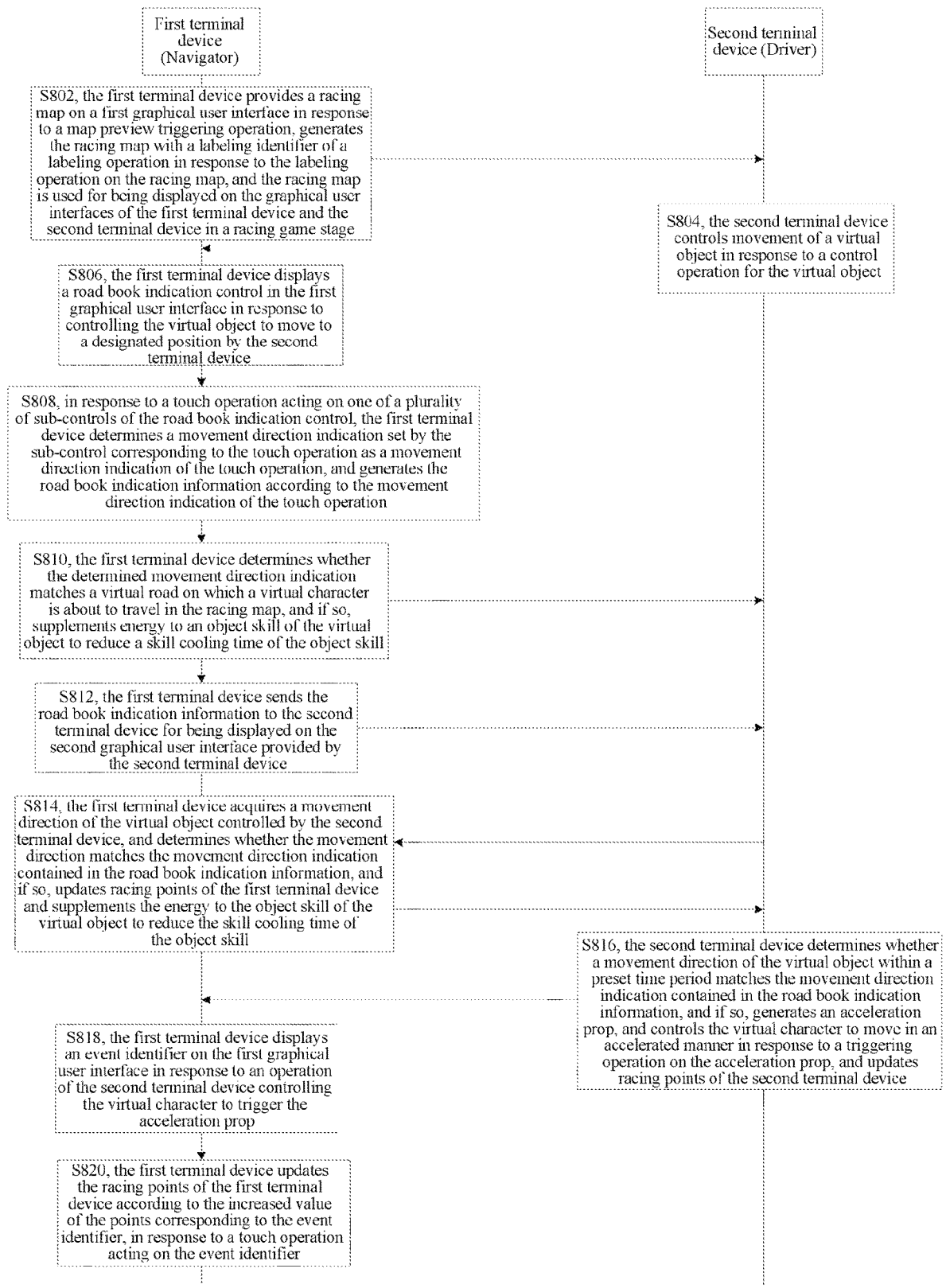
FIG. 8 is a flowchart of a method for controlling information in a racing game provided by one of embodiments of the present disclosure.

As shown in FIG. 8, the method includes the following steps:

in step S802, the first terminal device provides the racing map on the first graphical user interface in response to the map preview triggering operation, generates the racing map with the labeling identifier of the labeling operation in response to the labeling operation on the racing map, and the racing map is displayed on the graphical user interfaces of the first terminal device and the second terminal device in the racing game stage;

in step S804, the second terminal device controls the movement of the virtual object in response to the control operation for the virtual object;

in step S806, the first terminal device displays the road book indication control in the first graphical user interface in response to controlling the virtual object to move to the designated position by the second terminal device;

in step S808, in response to the touch operation acting on one of the plurality of sub-controls of the road book indication control, the first terminal device determines the movement direction indication set by the sub-control corresponding to the touch operation as the movement direction indication of the touch operation, and generates the road book indication information according to the movement direction indication of the touch operation;

in step S810, the first terminal device determines whether the determined movement direction indication matches the virtual road on which the virtual character is about to travel in the racing map, and if so, supplements the energy to the object skill of the virtual object to reduce the skill cooling time of the object skill;

in step S812, the first terminal device sends the road book indication information to the second terminal device, and displays it on the second graphical user interface provided by the second terminal device.

in step S814, the first terminal device acquires the movement direction of the virtual object controlled by the second terminal device, and determines whether the movement direction matches the movement direction indication contained in the road book indication information, and if so, updates the racing points of the first terminal device and supplements the energy to the object skill of the virtual object to reduce the skill cooling time of the object skill;

in step S816, the second terminal device determines whether the movement direction of the virtual object within the preset time period matches the movement direction indication contained in the road book indication information, and if so, generates the acceleration prop, and controls the virtual character to move in the accelerated manner in response to the triggering operation on the acceleration prop, and updates the racing points of the second terminal device;

in step S818, the first terminal device displays the event identifier on the first graphical user interface in response to an operation of the second terminal device controlling the virtual character to trigger the acceleration prop;

in addition to the operation of triggering the acceleration prop, the display of the event identifier on the first graphical user interface may also be triggered by an operation of the second terminal device triggering the object skill of the virtual object or an operation of the second terminal device controlling the virtual object to pass a designated region. The event identifier may specifically be referred to as a Quick Time Event (QTE) identifier, and the event identifier may be displayed in the first graphical user interface for the user of the first terminal device to touch the event identifier; and in step S820, the first terminal device updates the racing points of the first terminal device according to the increased value of the points corresponding to the event identifier in response to the touch operation acting on the event identifier.

Figure 9:
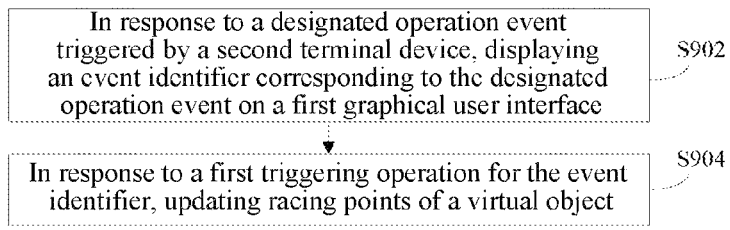
FIG. 9 is a flowchart of a method for controlling information in a racing game provided by one of embodiments of the present disclosure.

In one of the embodiments of the present disclosure, FIG. 9 shows a flowchart of a method for controlling information in a racing game, and referring to FIG. 9, he method includes the following steps S902 to S904.

In the step S902, in response to a designated operation event triggered by the second terminal device, an event identifier corresponding to the designated operation event is displayed on the first graphical user interface.

Here, the designated operation event is usually triggered by the second player operating the second terminal device, and the second player may also be referred to as the game player. When the second player usually needs to select a specific target to attack or execute a specific operation in a specific scenario during participating in the game, and in this case, the second player needs to trigger the designated operation event through the second terminal device installed with a game client to give a corresponding instruction, such as triggering the virtual object to release the skill, or controlling the virtual object to trigger a designated prop, etc. In the racing game, the event identifier may be an identifier corresponding to the specific operation displayed in the first graphical user interface after the second player controls the virtual object to execute the specific operation through the second terminal device. For example, taking a rally racing as an automobile race event as an example, the second player controls a vehicle to release the skill through the second terminal device, and the Quick Time Event (QTE) generated correspondingly to the vehicle releasing the skill will be displayed in the first graphical user interface, and in the automobile race event, the event identifier is the QTE. In an actual implementation, after the designated operation event is triggered by the second terminal device, the first graphical user interface usually displays the event identifier corresponding to the designated operation event. The event identifiers corresponding to different designated operation events may be the same or different.

In the step S904, in response to a first triggering operation for the event identifier, racing points of the virtual object are updated.

For ease of understanding, the following description is given by taking the event identifier as QTE as an example, the first triggering operation may be understood as an operation of clicking the QTE, the racing points may be understood as points reward obtained by the virtual object completing a challenge every time or clicking the QTE every time. Here, the first triggering operation is usually triggered by the first player operating the first terminal device. When a time identifier corresponding to the designated operation event is displayed on the first graphical user interface, the first player may trigger the event identifier through the first terminal device, thereby updating the racing points of the virtual object.

In the method for controlling the information in the racing game provided in an implementation, the first graphical user interface is provided by the first terminal device, the first graphical user interface at least includes the virtual object, and the movement of the virtual object is controlled by the second terminal device. First, in response to the designated operation event triggered by the second terminal device, the event identifier corresponding to the designated operation event is displayed on the first graphical user interface; then in response to the first triggering operation for the event identifier, the racing points of the virtual object are updated. The method realizes the interaction between the players corresponding to the first terminal device and the second terminal device, and the players cooperate closely to complete the racing game task, which enriches an interaction mode between players in the racing game, and also facilitates skilled players to lead novice players to participate in the game, improving game experience of the novice players.

There is further provided a method for controlling information in a racing game in an implementation, which is implemented on the basis of the method in the above-mentioned embodiments. The method focuses on describing a specific process of updating the racing points of the virtual object in response to the first trigger operation for the event identifier, which specifically corresponds to the following step S1004. In this method, the game scene picture displayed in the first graphical user interface is adjusted through the position change of the virtual object in the game scene, and the position change of the virtual object in the game scene is controlled by the second terminal device. The game scene picture displayed in the first graphical user interface is the same as the game scene picture displayed in the second graphical user interface provided by the second terminal device. The game scene picture may be understood as the displayed game picture content in the first graphical user interface other than individual controls that may be operated, and the game picture content usually includes the game scene, the virtual object etc. In an actual implementation, the virtual object may be controlled to move by the second terminal device, thereby changing the position of the virtual object in the game scene. When the position of the virtual object changes, the game scene picture displayed in the first graphical user interface will also be adjusted accordingly. In addition, in order to ensure the consistency of game-related information obtained between the players and facilitate instant interaction, the game scene pictures displayed in the first graphical user interface and the second graphical user interface are typically the same.

The designated operation event is triggered by at least one of the following manners: an operation of triggering a character skill of the virtual object by the second terminal device, an operation of controlling the virtual object to trigger a designated prop by the second terminal device, and an operation of controlling the virtual object to pass the designated region by the second terminal device. The character skill may be understood as a skill possessed by the virtual object, the designated prop may be understood as that the event identifier corresponding to triggering the prop may be displayed in the first graphical user interface after the virtual object triggers the prop, and the designated region may be understood as that the event identifier corresponding to passing the region in the first graphical user interface after the virtual object passes the region. For example, in the rally racing as the automobile race event, each vehicle usually has a corresponding character skill, such as a flying skill, etc. A designated vehicle as the virtual object may be controlled to release the flying skill to trigger the designated operation event, or the vehicle is controlled to use the designated prop of nitrogen by the second terminal device to achieve the strong acceleration, thereby triggering the designated operation event; or, the vehicle is controlled to pass the designated region in the acceleration wall, an acceleration hump or a racing track to trigger the designated operation event. In the actual implementations, any one of the above triggering manners, or any combination of the above three triggering manners, may be used to implement the triggering of the designated operation event, which may increase the number of interactions between the players and enrich the interaction modes.

The event identifier is provided with the increased value of the points corresponding to the event identifier, and the increased value of the points may be understood as a value of the points that may be increased after the corresponding designated operation event is triggered by the second terminal device and is displayed in the first graphical user interface. In the actual implementations, the event identifier is usually provided with the increased value of the points corresponding to the event identifier, and the increased values of the points corresponding to different event identifiers are usually different, such as "+50" or "+100", which may be set according to actual requests.

Figure 10:
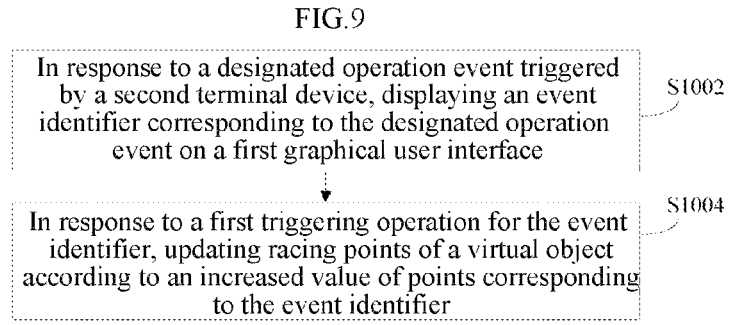
FIG. 10 is a flowchart of a method for controlling information in a racing game provided by one of embodiments of the present disclosure.

As shown in FIG. 10, the method includes the following steps:
- in step S1002, in response to the designated operation event triggered by the second terminal device, the event identifier corresponding to the designated operation event is displayed on the first graphical user interface; and
- in step S1004, in response to the first touch operation acting on the event identifier, the racing points of the virtual object are updated according to the increased value of the points corresponding to the event identifier.

For the ease of understanding, the following is described by taking the rally racing as the automobile race event. In the actual implementation, the first player who plays the role of navigator may trigger the event identifier displayed in the first graphical user interface through the first terminal device, and the increased value of the points corresponding to the event identifier is added on the basis of the current racing points of the virtual object, so as to realize the updating of the racing points of the virtual object.

The step of updating the racing points of the virtual object according to the increased value of the points corresponding to the event identifier may be realized by the following step 1.

In the step 1, the racing points of the virtual object are updated according to a triggering time of the first touch operation and the increased value of the points corresponding to the event identifier.

The triggering time may be understood as a specific time of the first touch operation acting on the event identifier. When the racing points are updated, the triggering time of the first touch operation should also be considered, and the increased value of the points actually obtained at different triggering times are usually different. In the actual implementation, it is necessary to update the racing points of the virtual object according to the triggering time of the first touch operation in combination of the increased value of the points corresponding to the event identifier. This way of considering the triggering time improves complexity of the interaction between the players and enriches the update manner of the racing points.

The event identifier is usually preset with multiple periods, and each period corresponds to an update manner of the racing points. For example, a total duration of an event identifier, such as the QTE, is 5 s, where 0 s to 2 s is a first preset period, 2 s to 4 s is a second preset period, and 4 s to 5 s is a third preset period. Among these three periods, each period usually has its corresponding update manner of the racing points, and the update manners may be different. For example, the update manner of the racing points corresponding to each period may be a different designated coefficient of the increased value of the points, etc.

Specifically, the step 1 may be realized through the following steps A to B:

In the step A, a period to which the triggering time of the first touch operation belongs is determined.

In an implementation, each event identifier is dynamically displayed with a timing sub-identifier, and the timing sub-identifier is used to indicate the period to which the current time belongs, which may assist the navigator in determining the time, order, etc. of triggering the event identifier, and may be helpful for improving a team's total score. After the first player triggers the event identifier displayed in the first graphical user interface through the first terminal device, the first player may first determine the period to which the triggering time belongs according to the timing sub-identifier. For example, still taking the following case as an example: the total duration of a QTE is still 5 s, where 0 s to 2 s is the first preset period, 2 s to 4 s is the second preset period, and 4 s to 5 s is the third preset period, if the triggering time of the first touch operation is 3 s, a specific period to which the current triggering time belongs may be determined as the second period through the timing sub-identifier.

In the step B, the racing points of the virtual object are updated according to the update manner corresponding to the determined period and the increased value of the points.

In an implementation, the update manner usually includes a coefficient of the increased value of the points corresponding to the event identifier. Specifically, the step B may be implemented by the following steps a to b.

In the step a, a final increased value is obtained by multiplying the coefficient of the increased value of the points corresponding to the determined period by the increased value of the points corresponding to the event identifier.

In an implementation, the final increased value may be obtained by multiplying the coefficient of the increased value of the points corresponding to the determined period by the increased value of the points corresponding to the event identifier. For example, still taking the following case as an example: the total duration of a QTE is 5 s, the corresponding increased value of the points is 100, where 0 s to 2 s is the first preset period, 2 s to 4 s is the second preset period, and 4 s to 5 s is the third preset period, the coefficient of the increased value of the points corresponding to the first period may be 200%, then the final increased value corresponding to this period is obtained by multiplying the coefficient by the increased value of the points corresponding to the QTE, that is, 200%*100=200; the coefficient of the increased value of the points corresponding to the second period may be 80%, then the final increased value corresponding to this period is obtained by multiplying the coefficient by the increased value of the points corresponding to the QTE, that is, 80%*100=80; the coefficient of the increased value of the points corresponding to the third period may be 60%, then the final increased value corresponding to this period is obtained by multiplying the coefficient by the increased value of the points corresponding to the QTE, that is, 60%*100=60;

In the step b, the final increased value is added to the racing points of the virtual object.

After the final increased value corresponding to the above period is obtained, the final increased value is added to the racing points of the virtual object to update the racing points of the virtual object.

In the method for controlling the information in the racing game provided in an implementation, first in response to the designated operation event triggered by the second terminal device, the event identifier corresponding to the designated operation event is displayed on the first graphical user interface; then in response to the first triggering operation acting on the event identifier, the racing points of the virtual object are updated according to the increased value of the points corresponding to the event identifier. The method realizes the interaction between the players corresponding to the first terminal device and the second terminal device, and the players cooperate closely to complete the racing game task, which enriches an interaction mode between players in the racing game, and also facilitates skilled players to lead novice players to participate in the game, improving game experience of the novice players.

Figure 11:
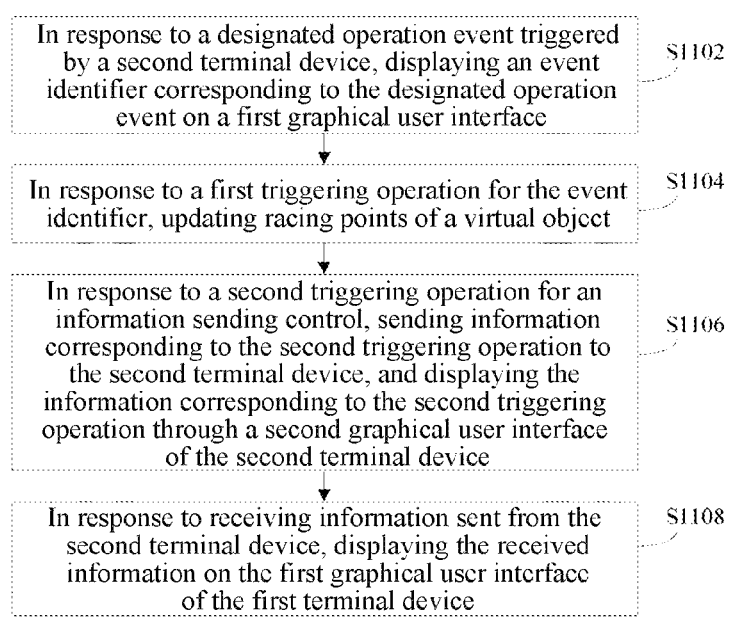
FIG. 11 is a flowchart of a method for controlling information in a racing game provided by one of embodiments of the present disclosure.

There is further provided a method for controlling information in a racing game in an implementation, and in this method, an information sending control is displayed in the first graphical user interface, the information sending control is used to send preset information. For example, interactive information or interactive emoticons may be sent. As shown in FIG. 11, the method includes the following steps S1102 to S1108.

In the step S1102, in response to the designated operation event triggered by the second terminal device, the event identifier corresponding to the designated operation event is displayed on the first graphical user interface.

In the step S1104, in response to the first triggering operation for the event identifier, the racing points of the virtual object are updated.

In the step S1106, in response to a second triggering operation for the information sending control, information corresponding to the second triggering operation is sent to the second terminal device, and the information corresponding to the second triggering operation is displayed by the second graphical user interface of the second terminal device.

Figure 12:
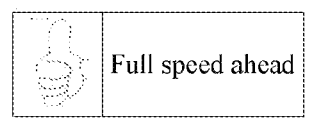
FIG. 12 is a schematic diagram of a manner for controlling information in a racing game provided by one of embodiments of the present disclosure.
Figure 12:
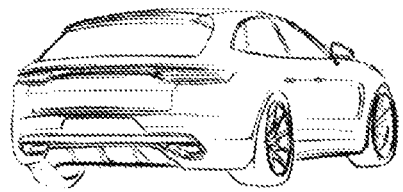

In an implementation, the second triggering operation may be triggered by the first player using the first terminal device, and the first player may trigger the information sending control displayed in the first graphical user interface through the first terminal device, and send the information that needs to interact with the second player to the second terminal device. After receiving the information, the second terminal device may display the information in the corresponding second graphical user interface, so that the second player may see the information through the second graphical user interface, thereby realizing the communication and interaction between the first player and the second player, and enriching the interaction mode between the players. For example, the first player operating the first terminal device may preset multiple different emoticons, and during the racing game, the first player may select a suitable emoticon, and then trigger the information sending control displayed in the first graphical user interface through the first terminal device to send a selected emoticon to the second terminal device. FIG. 12 shows a schematic diagram of a manner for controlling information in a racing game, and as shown in FIG. 12, the received emoticon is displayed by the second graphical user interface of the second terminal device, so that the second player sees the emoticon through the second graphical user interface.

In the step S1108, in response to receiving information sent from the second terminal device, the received information is displayed on the first graphical user interface of the first terminal device.

In an implementation, the second player operating the second terminal device may also send the information to the first terminal device through the second terminal device, and after receiving the information, the first terminal device may display the information in the corresponding first graphical user interface, so that the first player may see the information through the corresponding first graphical user interface, thereby realizing the communication and interaction between the first player and the second player. For example, the second player using the second terminal device may also preset multiple different emoticons, and during the racing game, the second player may select a suitable emoticon, and then send the selected emoticon to the first terminal device through the second terminal device. The received emoticon is displayed by the first graphical user interface of the first terminal device to make the first player see the emoticon through the first graphical user interface, so that the players may still interact quickly through the emoticon during a game interval.

In the method for controlling the information in the racing game provided in an implementation, in response to the designated operation event triggered by the second terminal device, the event identifier corresponding to the designated operation event is displayed on the first graphical user interface; in response to the first triggering operation for the event identifier, the racing points of the virtual object are updated; in response to the second triggering operation for the information sending control, the information corresponding to the second triggering operation is sent to the second terminal device, and the information corresponding to the second triggering operation is displayed by the second graphical user interface of the second terminal device; and in response to receiving the information sent from the second terminal device, the received information is displayed on the first graphical user interface of the first terminal device. The method realizes the interaction between the players corresponding to the first terminal device and the second terminal device, and the players cooperate closely to complete the racing game task, which enriches an interaction mode between players in the racing game, and also facilitates skilled players to lead novice players to participate in the game, improving game experience of the novice players.

In order to further understand the above-mentioned embodiments, the following is a further explanation by taking the rally racing as the automobile race event as an example. In the rally racing as the automobile race event, two real players may be matched as a group to play the roles of the driver and the navigator, respectively, the driver is mainly responsible for driving the vehicle, and the navigator is mainly responsible for providing real-time road book guidance and other auxiliary operations, and a final ranking is determined according to a sum of the points obtained by the driver and the navigator. In an initial casting stage, the players may select the roles they want to play in the rally racing according to their interests. In general, the driver tend to be the skilled player, and the navigator is suitable for the novice player. In a map preview stage, that is, a data loading stage, during a player data loading process, the first player who plays the role of the navigator may view a complete map through the first graphical user interface, and road book guide points in the game are labeled on the map. The first player may manually draw a map mark in the road book input region to assist the driver to quickly determine the racing track and improve the efficiency of road book guidance. In a competition stage, the driver and the navigator work together to win the points. The driver earns the points by competing for the first place and driving the vehicle to snatch gold coins on the racing track. FIG. 13 shows a schematic diagram of another manner for controlling information in a racing game, and referring to FIG. 13, the navigator may earns the huge points by guiding the road book or the QTE generated by clicking the strong acceleration of the vehicle.

When the vehicle is strongly accelerated, such as the vehicle releasing the skill, or using the nitrogen, or passing the acceleration wall, different numbers of QTEs are usually generated. The navigator may click the QTE to obtain the corresponding points, each QTE is usually preset with multiple periods, and each period corresponds to one update manner of the racing points. If the QTE is clicked in a crit period, the crit is also triggered, and accordingly, double points are got. FIG. 14 shows a schematic diagram of an update manner of the racing points, and referring to FIG. 14, three different sizes of QTEs are shown, and the corresponding increased value of the points are +100, +50 and +10, respectively. When the QTE with the increased value of the points of "+100" is clicked in a non-crit period, a randomly displayed score of 60, 80 or 100 may be earned, and the duration of the QTE is 2 s to 4 s, and the crit period accounts for 20%, and when this QTE is clicked in the crit period, the double points are earned, that is, "+200". When the QTE with the increased value of the points of "+50" is clicked in a non-crit period, a randomly displayed score of 30, 40 or 50 may be earned, and the duration of the QTE is 2 s to 5 s, and the crit period accounts for 30%, and when this QTE is clicked in the crit period, the double points are earned, that is, "+100". When the QTE with the increased value of the points of "+10" is clicked in a non-crit period, a randomly displayed score of 10 or 20 may be earned, and the duration of the QTE is 4 s to 6 s, and the crit period accounts for 40%, and when this QTE is clicked in the crit period, the double points are earned, that is, "+20".

The navigator's correct road book guidance, that is, a driving direction of the vehicle guided by the navigator being the same as a direction of the virtual road, may not only guide the driver to drive the vehicle, but also charge the vehicle's skill to reduce the vehicle's skill cooling time. When the driver releases the skill or other strong acceleration, a large number of QTEs will be generated. FIG. 15 shows a schematic diagram of generating a QTE in a racing game, and referring to FIG. 15, although the navigator cannot charge the vehicle by clicking the QTE, the navigator may get a lot of points to help the team obtain victory. When the vehicle is approaching the fork road in the virtual road, the road book guidance will also be triggered. After the navigator selects the route, if the driver follows the route guided by the navigator, "close cooperation" will be displayed, the navigator may get the double points, and the driver may get the acceleration prop, such as the acceleration wall, etc. If the driver does not follow the route guided by the navigator, "failing to cooperate" will be displayed, and neither the navigator nor the driver will earn the points.

The method for controlling the information in the racing game strengthens the cooperative relationship between the players, makes the association between the players more closely, lowers the experience threshold of the racing game, so that the novice players may quickly experience the core fun of the racing game. In addition, the real-time interaction between the players may also be realized, making the racing game more interesting.

Figure 16:
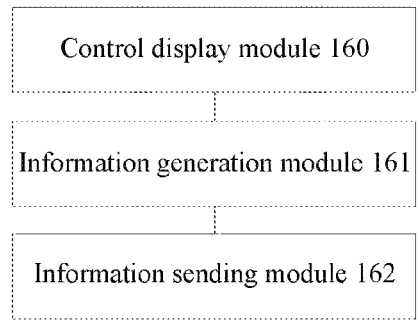
FIG. 16 is a schematic structural diagram of an apparatus for controlling information in a racing game provided by one of embodiments of the present disclosure.

Corresponding to the above method embodiments, FIG. 16 shows a schematic structural diagram of an apparatus for controlling information in a racing game, and referring to FIG. 16, a first graphical user interface is provided by a first terminal device, the first graphical user interface at least includes a virtual object, and movement of the virtual object is controlled by a second terminal device, and the apparatus includes:

a control display module 160, configured to display a road book indication control in the first graphical user interface in response to a road book triggering event;

an information generation module 161, configured to generate road book indication information in response to a triggering operation for the road book indication control; and an information sending module 162, configured to send the road book indication information to the second terminal device for being displayed on a second graphical user interface provided by the second terminal device, and the road book indication information is used for prompting a user of the second terminal device to control the movement of the virtual object based on the road book indication information.

In an implementation, the first terminal device displays the road book indication control in the first graphical user interface in response to the road book triggering event, generates the road book indication information in response to the triggering operation for the road book indication control, and then sends the road book indication information to the second terminal device for being displayed on the second graphical user interface provided by the second terminal device, the road book indication information is used for prompting the user of the second terminal device to control the movement of the virtual object based on the road book indication information. In this way, the racing game is completed by interaction between the first terminal device and the second terminal device, the first terminal device generates the road book indication information by triggering the road book indication control, and this information is displayed on the second terminal device to prompt the user of the second terminal device to control the movement of the virtual object based on this information. In this way, users of the first terminal device and the second terminal device cooperate closely together to complete a racing game task, which enriches an interaction mode between players in the racing game, and also facilitates skilled players to lead novice players to participate in the game, improving game experience of the novice players.

In an implementation, a game scene picture displayed in the first graphical user interface is adjusted through a position change of the virtual object in the game scene, and the position change of the virtual object in the game scene is controlled by the second terminal device.

In an implementation, the game scene picture displayed in the first graphical user interface and a game scene picture displayed in the second graphical user interface are identical.

In an implementation, the road book triggering event is triggered in the following manner: the virtual object is moved to a designated position in the game scene.

In an implementation, the apparatus also includes a prompt information display module, configured to display prompt information in the first graphical user interface in response to the road book triggering event, and the prompt information is used for prompting that the first terminal device is ready for receiving the triggering operation for the road book indication control.

In an implementation, the road book indication control includes a plurality of sub-controls, each sub-control is provided with a corresponding movement direction indication of a virtual object; and the information generation module is further configured to: in response to a touch operation acting on one of the plurality of sub-controls, determine a movement direction indication set by the sub-control corresponding to the touch operation as a target movement direction indication; and generate the road book indication information according to the target movement direction indication.

In an implementation, the road book indication control includes a road book input region; and the information generation module is further configured to: in response to a road book input operation acting on the road book input region, determine a target movement direction indication based on content input by the road book input operation; and generate the road book indication information according to the target movement direction indication.

In an implementation, the apparatus further includes a first determination module, configured to: determine whether the target movement direction indication meets a preset condition; and if the preset condition is met, update racing points of the first terminal device, and/or reduce a skill cooling time of the object skill of the virtual object by supplementing energy to an object skill.

In an implementation, the first determination module is further configured to: determine whether the target movement direction indication matches a virtual road on which the virtual object is about to travel in a racing map; and determine that the preset condition is met by the target movement direction indication, if the movement direction indication matches the virtual road on which the virtual object is about to travel in the racing map.

In an implementation, the apparatus further includes a second determination module, configured to: determine whether a movement direction of the virtual object matches a movement direction indication contained in the road book indication information; and if the movement direction matches the movement direction indication, update racing points of the first terminal device, and/or supplement energy to an object skill of the virtual object to reduce a skill cooling time of the object skill. In an implementation, the apparatus further includes a point update module, configured to: acquire a current position of the virtual object relative to the virtual road when the triggering operation is triggered; and update the racing points of the first terminal device according to the current position of the virtual object relative to the virtual road.

In an implementation, the virtual road includes at least one target region, each target region corresponds to an update manner of the racing points; and the point update module is further configured to: determine a target region to which the current position of the virtual object relative to the virtual road belongs; and update the racing points of the first terminal device according to an update manner of the racing points corresponding to the target region to which the current position belongs.

In an implementation, the apparatus further includes a map preview module, configured to: provide the racing map on the first graphical user interface in response to a map preview triggering operation; and in response to a labeling operation on the racing map, generate the racing map with a labeling identifier of the labeling operation, and the racing map is used for being displayed on the graphical user interface of the first terminal device and/or the second terminal device during a racing game stage.

In an implementation, the map preview triggering operation is triggered by a triggering operation of game data loading; and the map preview module is further configured to: display the labeling identifier of the labeling operation on the racing map in response to the labeling operation on the racing map; and generate the racing map with the labeling identifier of the labeling operation in response to an event that the game data loading is completed.

Figure 17:
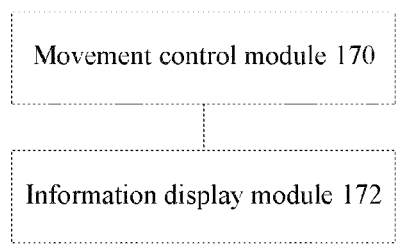
FIG. 17 is a schematic structural diagram of an apparatus for controlling information in a racing game provided by one of embodiments of the present disclosure.

Referring to a schematic structural diagram of an apparatus for controlling information in a racing game shown in FIG. 17, a second graphical user interface is provided by a second terminal device, the second graphical user interface at least includes a virtual object, and movement of the virtual object is controlled by the second terminal device; the apparatus includes:

a movement control module 170, configured to control the movement of the virtual object in response to a control operation for the virtual object; and an information display module 172, configured to, in response to an event of receiving road book indication information, display the received road book indication information on the graphical user interface, and the road book indication information is used for prompting a user of the second terminal device to control the movement of the virtual object based on the road book indication information; and the road book indication information is generated by a first terminal device.

In an implementation, the movement control module is further configured to: control the virtual object to move in a game scene displayed by the second graphical user interface in response to the control operation for the virtual object; adjust a position of the virtual object in the game scene displayed by the second graphical user interface according to the movement of the virtual object; and determine a game scene picture displayed in the second graphical user interface according to the position of the virtual object in the game scene.

In an implementation, the game scene picture displayed in the second graphical user interface and a game scene picture displayed in a first graphical user interface provided by the first terminal device are identical.

In an implementation, the apparatus further includes a third determination module, configured to: determine whether a movement direction of the virtual object within a preset time period matches a movement direction indication contained in the road book indication information; generate an acceleration prop if the movement direction matches the movement direction indication; control the virtual object to move in an accelerated manner in response to a triggering operation on the acceleration prop; and/or, update racing points of the second terminal device if the movement direction matches the movement direction indication.

In an implementation, there is further provided an electronic device, including a processor and a memory, and the memory stores machine-executable instructions that may be executed by the processor, the processor executes the machine-executable instructions to implement the method for controlling the information in the racing game described above.

Figure 18:
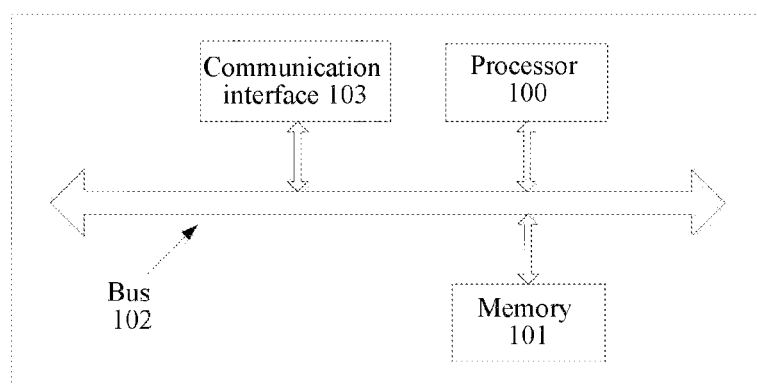
FIG. 18 is a schematic structural diagram of an electronic device according to an embodiment of the disclosure.

Referring to FIG. 18, the electronic device includes a processor 100 and a memory 101, and the memory 101 stores the machine-executable instructions that may be executed by the processor 100, and the processor 100 executes the machine-executable instructions to realize the method for controlling the information in the racing game described above.

Further, the electronic device shown in FIG. 18 further includes a bus 102 and a communication interface 103, and the processor 100, the communication interface 103 and the memory 101 are connected through the bus 102.

The memory 101 may include a high-speed Random Access Memory (RAM), and may also include a non-volatile memory, such as at least one disk memory. The communication connection between the network element of the system and at least one other network element is realized through at least one communication interface 103 (being wired or wireless), which may use the Internet, a wide region network, a local network, a metropolitan region network, and the like. The bus 102 may be an ISA bus, a PCI bus, or an EISA bus, or the like. The bus may be divided into an address bus, a data bus, a control bus, and the like. For ease of representation, only one bidirectional arrow is shown in FIG. 18, but it does not mean that there is only one bus or one type of bus.

The processor 100 may be an integrated circuit chip with signal processing capability. In the implementation process, each step of the above-mentioned method may be completed by a hardware integrated logic circuit in the processor 100 or an instruction in the form of software. The above-mentioned processor 100 may be a general-purpose processor, including a central processing unit (CPU), a network processor (NP), etc.; it may also be a digital signal processor (DSP), application specific integrated circuit (ASIC), field-programmable gate array (FPGA) or other programmable logic devices, discrete gate or transistor logic devices, and discrete hardware components, which may implement or execute various methods, steps and logical block diagrams disclosed in the embodiments of the present disclosure. The general-purpose processor may be a microprocessor or the processor may be any conventional processor or the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory 101, and the processor 100 reads the information in the memory 101, and completes the steps of the method in the embodiments in combination with its hardware.

In an implementation, there is further provided a machine-readable storage medium, and the machine-readable storage medium stores machine-executable instructions, which when invoked and executed by a processor, cause the processor to implement the method for controlling the information in the racing game described above.

The embodiments of the present disclosure bring the following beneficial effects:

in the method and apparatus for controlling the information in the racing game, and the electronic device, the first terminal device displays the road book indication control in the first graphical user interface in response to the road book triggering event, generates the road book indication information in response to the triggering operation for the road book indication control, and then sends the road book indication information to the second terminal device for being displayed on the second graphical user interface provided by the second terminal device, the road book indication information is used for prompting the user of the second terminal device to control the movement of the virtual object based on the road book indication information. In this way, the racing game is done by interaction between the first terminal device and the second terminal device, the first terminal device generates the road book indication information by triggering the road book indication control, and the road book indication information is displayed on the second terminal device to prompt the user of the second terminal device to control the movement of the virtual object based on the road book indication information. In this way, users of the first terminal device and the second terminal device cooperate closely together to complete a racing game task, which enriches an interaction mode between players in the racing game, and also facilitates skilled players to lead novice players to participate in the game, improving game experience of the novice players. In order to make the above-mentioned objectives, features and advantages of the present disclosure more clearly understood, preferred embodiments are exemplified below, and are described in detail as follows in conjunction with the drawings.

Those skilled in the art may clearly understand that, for the convenience and brevity of description, for the specific working process of the system and apparatus described above, reference may be made to the corresponding process in the foregoing method embodiments, which will not be repeated here.

The functions, if implemented in the form of software functional units and sold or used as independent products, may be stored in a computer-readable storage medium. Based on this understanding, in essence, the technical solution of the present disclosure or the part that contributes to the prior art or the part of the technical solution may be embodied in the form of a software product. The computer software product is stored in a storage medium and includes several instructions to enable a computer device (which may be a personal computer, a server, or a network device, etc.) to perform all or part of the steps of the method described in each embodiment of the present disclosure. The aforementioned storage media includes a U disk, a mobile hard disk, a read-only memory (ROM), a random access memory (RAM), a magnetic disk or an optical disk and other media that may store program codes.

In the description of the present disclosure, it should be noted that the orientation or positional relationship indicated by the terms "center", "up", "down", "left", "right", "vertical", "horizontal", "inside", "outside" and the like is based on the orientation or positional relationship shown in the attached drawings. It is only for the convenience of describing the present disclosure and simplifying the description, and does not indicate or imply that the device or element referred to must have a specific orientation, be constructed and operate in a specific orientation, thus which cannot be understood as limiting the resent disclosure. In addition, the terms "first", "second" and "third" are used for descriptive purposes only and cannot be understood as indicating or implying relative importance.

Finally, it should be noted that the above embodiments are only specific embodiments of the present disclosure, which are used to explain the technical scheme of the present disclosure and not to limit it. The scope of protection of the present disclosure is not limited to this. Although the present disclosure has been described in detail with reference to the foregoing embodiments, those skilled in the art should understand that: any person familiar with the technical field may modify or easily think of changes to the technical solution described in the foregoing embodiments, or equivalently replace some of the technical features within the technical scope of the present disclosure. However, these modifications, changes or substitutions do not make the essence of the corresponding technical solutions deviate from the spirit and scope of the technical solutions of the embodiments of the present disclosure, and should be included in the scope of protection of the present disclosure. Therefore, the protection scope of the present disclosure shall be subject to the protection scope of the claims.

What is claimed is:

1. A method for controlling information in a racing game, comprising:
  providing, by a first terminal device, a first graphical user interface;
    wherein a second graphical user interface is provided by a second terminal device, the first terminal device is one of a local terminal device and a client device of a cloud interaction system, and the second terminal device is the other of the local terminal device and the client device of the cloud interaction system;
    wherein the first graphical user interface comprises a virtual object, movement of the virtual object is controlled by the second terminal device, and a first game scene picture displayed in the first graphical user interface matches a second game scene picture displayed in the second graphical user interface;
  displaying, by a first terminal device, a road book indication control in the first graphical user interface in response to a road book triggering event, wherein the road book triggering event comprises one of following:
    the virtual object reaching a predefined position in a racing map associated with the racing game;
    a user operation performed on the first terminal device or the second terminal device; or
    the virtual object being in a predefined game state detected by the cloud interaction system;
  generating, by the first terminal device, road book indication information in response to a triggering operation for the road book indication control; and
  sending, by the first terminal device, the road book indication information to the second terminal device for being displayed on the second graphical user interface provided by the second terminal device, wherein the road book indication information is used for prompting a user of the second terminal device to control the movement of the virtual object based on the road book indication information.

2. The method according to claim 1, further comprising:
  adjusting the first game scene picture displayed in the first graphical user interface in response to a position change of the virtual object, wherein the position change of the virtual object in the first game scene is controlled by the second terminal device.

3. The method according to claim 2, wherein the first game scene picture displayed in the first graphical user interface and the second game scene picture displayed in the second graphical user interface are identical.

4. The method according to claim 1, further comprising:
  displaying prompt information in the first graphical user interface in response to the road book triggering event, wherein the prompt information is used for prompting that the first terminal device is ready for receiving the triggering operation.

5. The method according to claim 1, wherein the road book indication control comprises a plurality of sub-controls, and each sub-control is provided with a corresponding movement direction indication of the virtual object; and
  the generating the road book indication information in response to the triggering operation for the road book indication control comprises:
    in response to a touch operation acting on one of the plurality of sub-controls, determining a movement direction indication set by the sub-control corresponding to the touch operation as a target movement direction indication; and
    generating the road book indication information according to the target movement direction indication.

6. The method according to claim 1, wherein the road book indication control comprises a road book input region; and
  the generating the road book indication information in response to the triggering operation for the road book indication control comprises:
    in response to a road book input operation acting on the road book input region, determining a target movement direction indication based on content input by the road book input operation; and
    generating the road book indication information according to the target movement direction indication.

7. The method according to claim 5, further comprising:
  determining whether the target movement direction indication meets a preset condition; and
  in response to that the target movement direction indication meets the preset condition, performing at least one of the following operations:
    updating racing points of the first terminal device, or reducing a skill cooling time of an object skill of the virtual object by supplementing energy to the object skill.

8. The method according to claim 7, wherein the determining whether the target movement direction indication meets the preset condition comprises:
  determining whether the target movement direction indication matches a virtual road on which the virtual object is about to travel in the racing map; and
  determining that the target movement direction indication meets the preset condition, in response to that the movement direction indication matches the virtual road.

9. The method according to claim 1, wherein the method further comprises:
  determining whether a movement direction of the virtual object matches a movement direction indication contained in the road book indication information; and
  in response to that the movement direction matches the movement direction indication, performing at least one of the following operations:
    updating racing points of the first terminal device, or reducing a skill cooling time of an object skill of the virtual object by supplementing energy to the object skill.

10. The method according to claim 1, wherein the method further comprises:
acquiring a current position of the virtual object relative to a virtual road in response to the triggering operation; and
updating racing points of the first terminal device according to the current position.

11. The method according to claim 10, wherein the virtual road comprises at least one target region, and each target region corresponds to one update manner of the racing points; and
the updating the racing points of the first terminal device according to the current position comprises:
determining a target region to which the current position belongs; and
updating the racing points of the first terminal device according to an update manner of the racing points corresponding to the target region.

12. The method according to claim 1, wherein the method further comprises:
providing the racing map on the first graphical user interface in response to a map preview triggering operation; and
in response to a labeling operation on the racing map, generating the racing map with a labeling identifier of the labeling operation, wherein the racing map is used for being displayed on at least one of the first graphical user interface and the second graphical user interface.

13. The method according to claim 12, wherein, the map preview triggering operation is triggered by a triggering operation of game data loading; and
the generating the racing map with the labeling identifier of the labeling operation in response to the labeling operation on the racing map comprises:
displaying the labeling identifier on the racing map in response to the labeling operation on the racing map; and
generating the racing map with the labeling identifier in response to that the game data loading is completed.

14. A method for controlling information in a racing game, comprising:
providing, by a second terminal device, a second graphical user interface;
wherein a first graphical user interface is provided by a first terminal device, the first terminal terminal device is one of a local terminal device and a client device of a cloud interaction system, and the second terminal device is the other of the local terminal device and the client device of the cloud interaction system;
wherein the second graphical user interface comprises a virtual object, movement of the virtual object is controlled by the second terminal device, and a first game scene picture displayed in the first graphical user interface matches a second game scene picture displayed in the second graphical user interface;
controlling, by the second terminal device, the movement of the virtual object in response to a control operation for the virtual object;
receiving, by the second terminal device, road book indication information sent by the first terminal device; wherein the road book indication information is generated by the first terminal device;
in response to an event of receiving the road book indication information, displaying the road book indication information on the second graphical user interface;
wherein the road book indication information is used for prompting a user of the second terminal device to control the movement of the virtual object based on the road book indication information.

15. The method according to claim 14, wherein the controlling the movement of the virtual object in response to the control operation for the virtual object further comprises:
controlling the virtual object to move in the second game scene displayed by the second graphical user interface in response to the control operation;
adjusting a position of the virtual object in the second game scene displayed by the second graphical user interface according to the movement of the virtual object; and
determining the second game scene picture displayed in the second graphical user interface according to the position of the virtual object.

16. The method according to claim 15, wherein the second game scene picture displayed in the second graphical user interface and the first game scene picture displayed in the first graphical user interface provided by the first terminal device are identical.

17. The method according to claim 14, wherein the method further comprises:
determining whether a movement direction of the virtual object within a preset time period matches a movement direction indication contained in the road book indication information;
in response to that the movement direction matches the movement direction indication, performing at least one of the following operations:
generating an acceleration prop, and controlling the virtual object to move in an accelerated manner in response to a triggering operation on the acceleration prop; or,
updating racing points of the second terminal device.

18. An electronic device comprising a processor and a memory, wherein machine-executable instructions that are capable of being executed by the processor are stored by the memory, and the processor is configured to execute the machine-executable instructions to implement a method for controlling the information in the racing game, and the method comprises:
providing, by a first terminal device, a first graphical user interface;
wherein a second graphical user interface is provided by a second terminal device, the first terminal device is one of a local terminal device and a client device of a cloud interaction system, and the second terminal device is the other of the local terminal device and the client device of the cloud interaction system;
wherein the first graphical user interface comprises a virtual object, movement of the virtual object is controlled by the second terminal device, and a first game scene picture displayed in the first graphical user interface matches a second game scene picture displayed in the second graphical user interface;
displaying, by a first terminal device, a road book indication control in the first graphical user interface in response to a road book triggering event; wherein the road book triggering event comprises one of following:
the virtual object reaching a predefined position in a racing map associated with the racing game;
a user operation performed on the first terminal device or the second terminal device; or
the virtual object being in a predefined game state detected by the cloud interaction system;

generating, by the first terminal device, road book indication information in response to a triggering operation for the road book indication control; and sending, by the first terminal device, the road book indication information to the second terminal device for being displayed on the second graphical user interface provided by the second terminal device, wherein the road book indication information is used for prompting a user of the second terminal device to control the movement of the virtual object based on the road book indication information.

19. The electronic device according to claim 18, further comprising:

adjusting a game scene picture displayed in the first graphical user interface in response to a position change of the virtual object in a game scene, wherein the position change of the virtual object in the game scene is controlled by the second terminal device.

\* \* \* \* \*